United States Patent [19]

Shiraki et al.

[11] Patent Number: 5,056,814
[45] Date of Patent: Oct. 15, 1991

[54] PAD FOR AIR BAG DEVICE

[75] Inventors: Kouji Shiraki, Gifu; Tadashi Yamamoto, Aichi; Hiroaki Shinto, Toyota, all of Japan

[73] Assignee: Toyoda Gosei Co., Ltd., Nishikasugai, Japan

[21] Appl. No.: 520,827

[22] Filed: May 9, 1990

[30] Foreign Application Priority Data

May 10, 1989 [JP] Japan .............. 01-053654[U]

[51] Int. Cl.⁵ .............................. B60R 21/08
[52] U.S. Cl. .................... 280/731; 280/743
[58] Field of Search ............ 280/723, 731, 732, 743, 280/751, 752

[56] References Cited

U.S. PATENT DOCUMENTS

| 4,334,699 | 6/1982 | Patzelt et al. | 280/731 |
| 4,752,083 | 6/1988 | Honda | 280/731 |
| 4,852,907 | 8/1989 | Shiraki et al. | 280/731 |

FOREIGN PATENT DOCUMENTS 0284123 2/1988 European Pat. Off. .
3811373 10/1988 Fed. Rep. of Germany .
57-053654 3/1982 Japan .
5720177 4/1982 Japan .

OTHER PUBLICATIONS

Vol. 12, No. 478 (M-775) (3325), Dec. 14, 1988, Abstract Appln. No. 62-293305, Appln. No. 62-29305.
European Search Report Appln. No. EP90108756, Aug. 21, 1990.

Primary Examiner—Kenneth R. Rice
Attorney, Agent, or Firm—Cushman, Darby & Cushman

[57] ABSTRACT

A pad covering an inflatable air bag for use in an air bag device provided with an upper wall which is broken by inflation of the air bag, and side walls which extend downward from the peripheral edges of the upper wall. A base insert made of metal is disposed next to the side walls, and a flexible net insert is connected to the inner surface side of the upper side of the base insert through the attaching plate. The base insert, the net insert and the attaching plate are covered by the coating layer made of soft synthetic resin. The net insert is connected to the attaching plate by means of sewing, and the attaching plate is fixed to the base insert preferably by rivets.

11 Claims, 4 Drawing Sheets

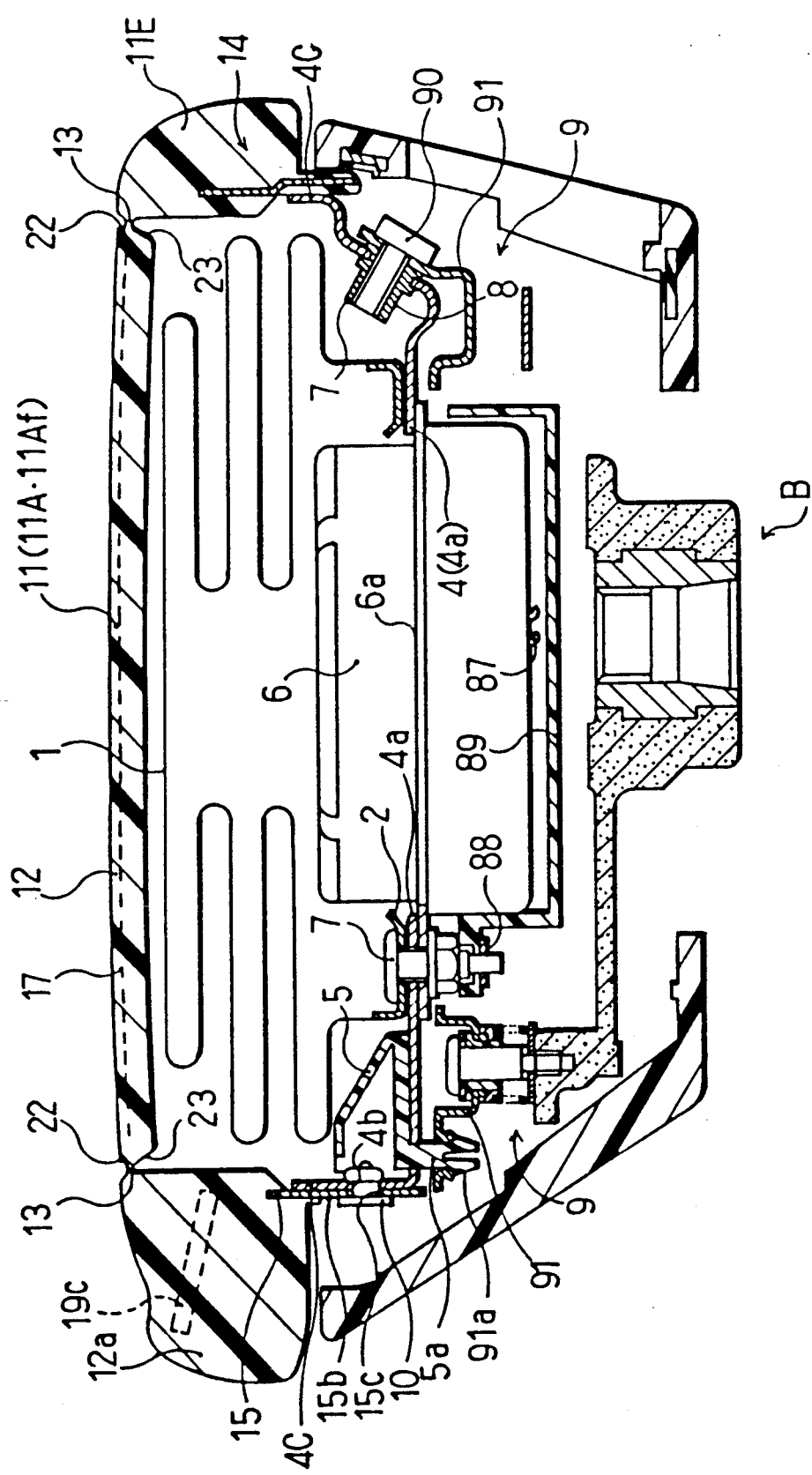

PAD FOR AIR BAG DEVICE

BACKGROUND OF THE INVENTION (1) Field of the Invention

The present invention relates to a pad for use in an air bag device installed in an automobile or the like and covering an inflatable air bag.

(2) Description of the Prior Art

The pad for an air bag device disclosed in Japanese Patent Publication No. 20177/1982 has a cylindrical base insert made of metal embedded in side walls of the pad.

This pad comprises an upper wall and side walls extending downward from peripheral edges of the upper wall so as to cover the inflatable air bag. A flexible net insert is embedded in the upper wall, and a cylindrical base insert made of metal is embedded in the side walls. A coating layer made of soft synthetic resin covers the base insert and the net insert.

Also in the pad, the net insert is extended to the position of the side walls and connected to an inner circumferential surface on upper side of the base insert.

To make the pad, the extension portion of the net insert is attached to the inner circumferential surface on upper the side of the base insert. A stationary plate is then attached to the inner circumferential surface of the extension portion of the net insert. The extension portion of the net insert is held by the base insert and the stationary plate, thereby connecting the net insert with the base insert.

In the pad in the prior art, however, the flexible net insert is connected directly to the inner circumferential surface of the rigid metal base insert.

Consequently, the number of processes required during manufacture and the manufacturing cost of the pad increase.

Because the portion to which the net insert is attached is the side of the inner circumferential surface of the cylindrical base insert, the net insert has flexibility. Consequently, when the extension portion of the net insert is attached to the predetermined portion of the base insert, it is difficult to set the flexible net insert at the side of the inner circumferential surface of the base insert.

SUMMARY OF THE INVENTION

An object of the invention is to provide a pad for an air bag device wherein the flexible net insert can be connected to the rigid base insert easily and the number of the processes during manufacturing and the manufacturing cost can be reduced.

The above object can be achieved by a pad covering an inflatable air bag for use in an air bag device, wherein the pad is provided with an upper wall that is broken when the air bag inflates, and side walls that extend downward from the peripheral edges of the upper wall. The pad comprises a base insert made of metal and disposed at the side walls, a flexible net insert disposed at the upper wall, an attaching plate made of synthetic resin for connecting the base insert to the net insert, and a coating layer made of soft synthetic resin for covering the base insert, the net insert and the attaching plate.

According to the present invention, the flexible net insert is connected to the base insert by the attaching plate made of synthetic resin. The net insert is connected to the attaching plate by first connecting means such as a sewn joint, and the attaching plate having the net insert attached thereto is connected to the base insert by second connecting means such as a rivet.

That is, in the pad for the air bag device according to this invention, the net insert can be joined with the attaching plate made of synthetic resin first. The attaching plate is attached to the predetermined portion of the inner circumferential surface of the base insert.

The attaching plate made of synthetic resin connected to the net insert can be attached easily to the predetermined portion of the base insert.

Consequently in the pad for the air bag device according to this invention, since the net insert can be connected easily to the base insert made of metal, the number manufacturing processes and the manufacturing cost can be reduced.

BRIEF DESCRIPTION OF THE DRAWINGS

FIG. 4 is a fragmentary sectional view taken along line IV—IV of FIG. 3.

DESCRIPTION OF THE PRESENTLY PREFERRED EXEMPLARY EMBODIMENTS

An embodiment of the invention will now be described based on the accompanying drawings.

Figure 1:
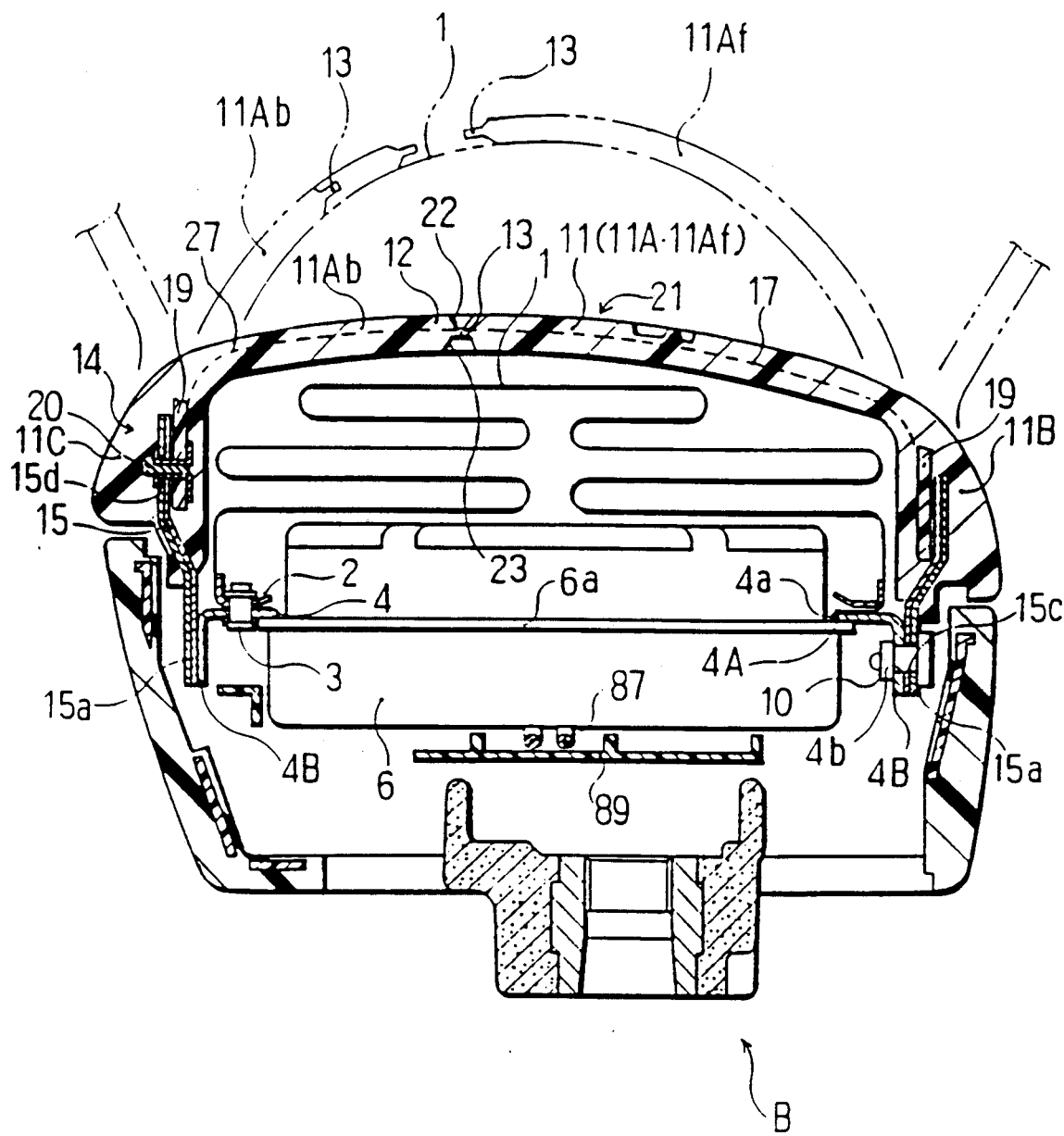
FIG. 1 is a schematic sectional view of an embodiment of the invention illustrating an air bag device, and is a fragmentary sectional view taken along line I—I of FIG. 3.
Figure 3:
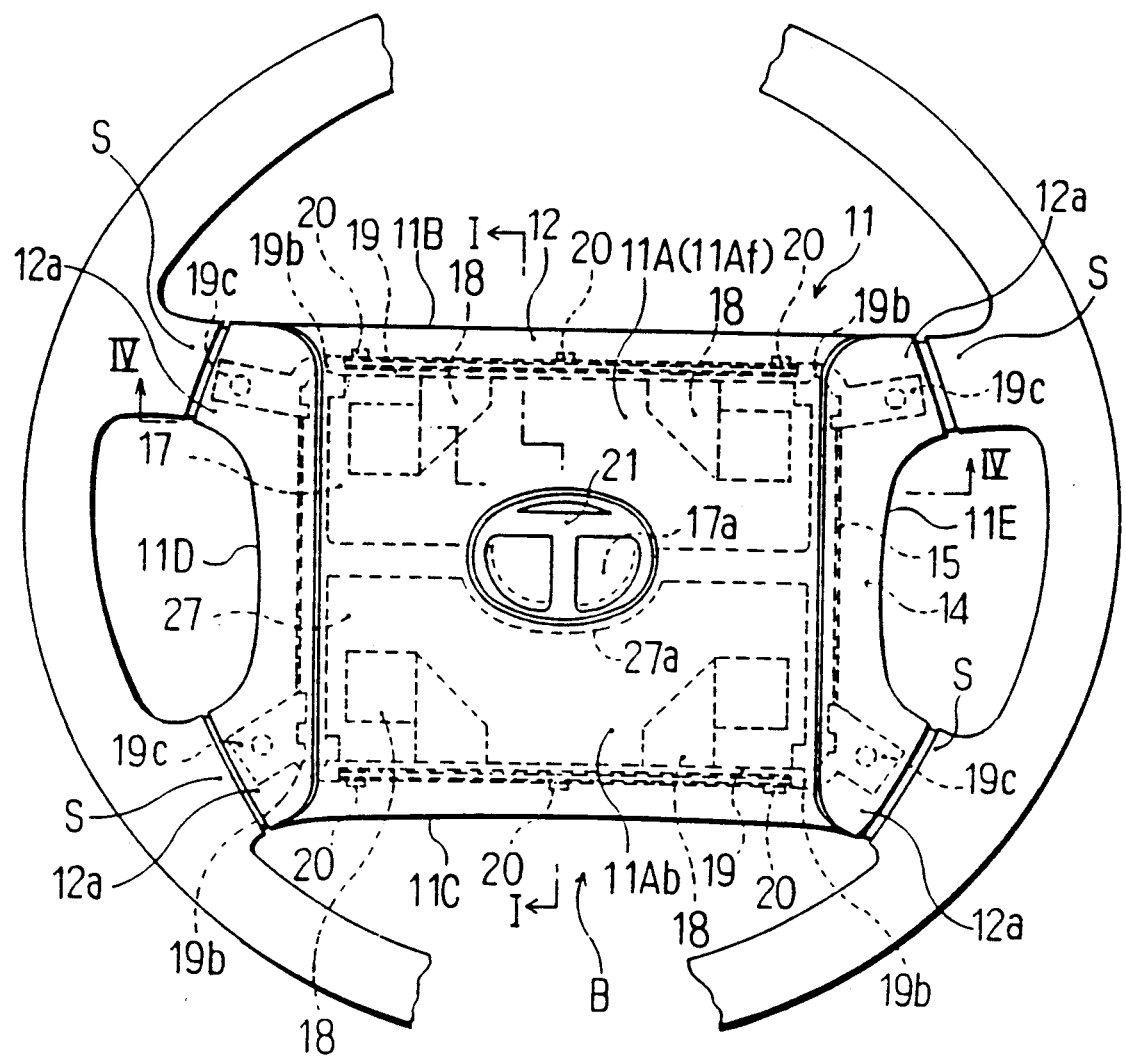
FIG. 3 is a plane view illustrating use mode of the embodiment.

A pad 11 shown in FIGS. 1, 3 and 4 is provided above a boss section B of a steering wheel so as to cover an air bag 1. The pad 11 is of box shape, and is provided with an upper wall 11A of rectangular shape viewing from the upper side and four side walls 11B, 11C, 11D, 11E extending downward from the peripheral edges of the upper wall 11A. The pad 11 is constituted by an insert 14 and a coating layer 12 made of soft synthetic resin such as polyurethane by means of injection molding.

The upper wall 11A of the pad 11 has a thin-walled portion 13 of H-like shape viewing from the upper side. When the air bag 1 is inflated, the upper wall 11A of the pad can be easily broken by having the forward upper wall 11Af and the rearward upper wall break apart at thin-walled portion 13.

The thin-walled portion 13 is formed by a concave groove 22 on the upper surface of the coating layer 12 and a concave groove 23 on the lower surface thereof. Concave groove 23 is formed opposite at the lower surface of the ornamental portion 21 so that the thin-walled portion 13 is formed.

The insert 14 comprises a base insert 15, attaching plates 19 and two net inserts 17, 27.

Figure 2:
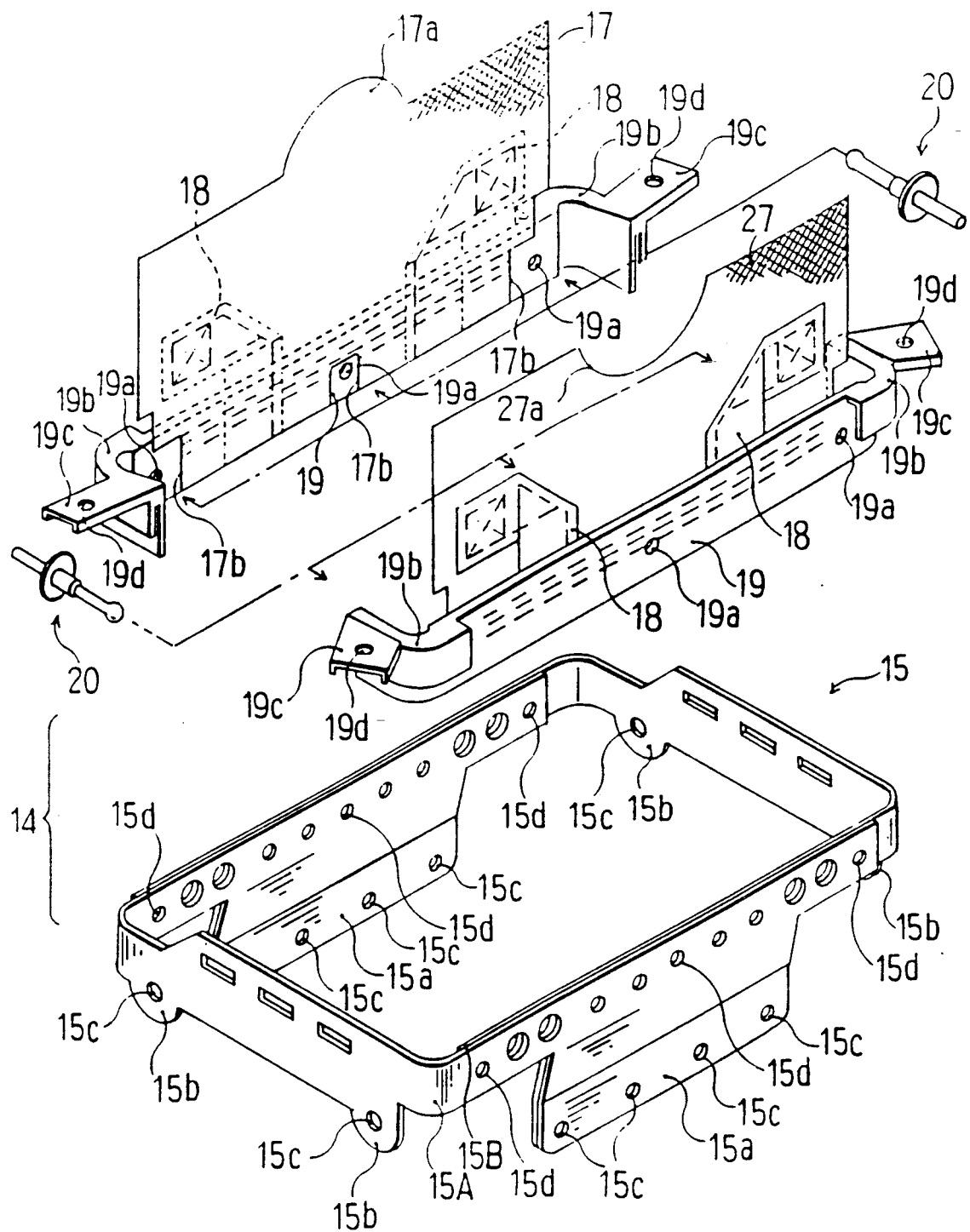
FIG. 2 is an exploded perspective view illustrating inserts in the embodiment.

The base insert 15 as shown in FIG. 2 is of rectangular frame shape, and is formed by a metal plate made of a material such as steel or aluminium. The base insert 15 is made by joining two sheet members 15A, 15B by rivets 20.

The base insert 15 has attaching pieces 15a, 15b that extend downward from the front and rear walls and right and left walls. Each of the attaching pieces 15a, 15b has attaching holes 15c for attaching the base insert 15 to the bag holder 4 by rivets 10 (refer to FIGS. 1, 2, and 4).

The base insert 15 further has attaching holes 15d at the upper portion of the front and rear walls. Through these attaching holes 15d, the attaching plate 19 is connected to the base insert 15 by rivets 20. Other through holes of the base insert 15 are meant to prevent the peeling of the coating layer 12 from the base insert 15.

The net inserts 17, 27 are embedded in the coating layer 12. These net inserts 17, 27 as shown in FIGS. 1 and 2 are provided so that when the upper wall 11A of the pad is opened due to the inflation of the air bag 1, each of the upper walls 11Af, 11Ab is left connected to the side walls 11B, 11C.

The net inserts 17, 27 are made of synthetic fiber such as polyamide having flexibility. These net inserts 17, 27 are of rectangular shape slightly smaller than the upper walls 11Af, 11Ab. The net inserts 17, 27 are provided with a convex portion 17a and a concave portion 27a respectively at the ornamental portion 21 (refer to FIGS. 2 and 3). Reference numeral 18 designates a reinforcing piece made of aramid fiber. Polyamid fiber or other material having high tensile strength and flexibility may be also used. Each reinforcing piece 18 is attached to each of the net inserts 17, 27 by sewing. Concave portions 17b at the lower side of the net inserts 17, 27 prevent the interference between the rivet 20 and the attaching plate 19.

The attaching plate 19 is made of synthetic resin such as polyamide, polyvinyl chloride, polyolefin etc. As shown in FIG. 2, one side fringe portion of each of the net inserts 17, 27 is connected to the attaching plate 19 along its fringe by sewn seams connecting means. As the first, in addition to a plurality of staples of U-like shape may be utilized to join the net inserts 17, 27 to the attaching plate 19. An adhesive agent may be utilized as the first connecting means. During the injection molding of the attaching plate 19, each of the net inserts 17, 27 is set to the cavity, and the molded part of the attaching plate 19 integrated with the net inserts 17, 27 may be the first connecting means. The attaching plate 19 has three attaching holes 19a for connecting, using rivets 20 as the second connecting means at the predetermined position.

The attaching plate 19 has cover portions 19b fitted to the upper side of the four corners of the base insert 15 for covering the upper side thereof. Each cover portion 19b has an extension portion 19c extending further outward nearly in the horizontal direction. Each extension portion 19c is disposed within a resin portion 12a extending along each spoke section S (FIG. 3) in the coating layer 12 made of soft synthetic resin of the pad 11. The extension portion 19c is provided to keep the desired shape of each resin portion 12a (refer to FIGS. 3 and 4). Numeral 19d designates a through hole for preventing the peeling of the resin portion 12a.

Further as shown in FIG. 1, the upper end of the attaching plate 19 is higher than the upper end of the base insert 15.

In addition to the rivets, bolt-nut coupling may be utilized as the second connecting means.

An air bag 1 is folded and enclosed in the pad 11 as shown in FIGS. 1 and 4. The bag 1 is inflated by gas generated by an inflator 6. The air bag 1 is mounted on a bag holder 4. The air bag 1 is secured between an annular retainer 2 and the bag holder 4 by rivets 3 and bolts 7. The bag holder 4 is secured to a flange portion 6a of the inflator 6 by rivets 3 and bolts 7.

The bag holder 4 comprises a bottom wall 4A and four side walls 4B, 4C extending from the peripheral edges of the bottom wall 4A. The bottom wall 4A which has a rectangular shape and has an inserting hole 4a for inserting the inflator 6 at the center. Each side wall 4B extends downwardly from the front and rear fringes of the bottom wall 4A. Each side wall 4C extends upwardly from the right and left fringes of the bottom wall 4A. These side walls 4B, 4C have an attaching hole 4b corresponding to the attaching hole 15c of the base insert 15. The base insert 15 is fixed by the rivet 10 to the bag holder 4 through these attaching holes 4b, 15c. These rivets 10 including 10 as well as the rivets 20 are blind type of rivets, which can be applied from one side of the attaching hole.

In the bag holder 4, a part of the lateral side walls 4C is inclined as shown in the right side of FIG. 4. Two nuts 8 are fixed to such inclined portion. The bag holder 4 is fixed by a bolt 90 through these nuts 8 to a movable contact plate 91 of a horn switch mechanism 9 fixed to both lateral sides in a core metal of a steering wheel.

Consequently, the pad 11 of the embodiment together with the air bag 1 and the inflator 3 is provided above the boss section B on the horn switch mechanism 9.

Numeral 5 at the left side of FIG. 4 designates an insert member fixed to the bag holder 4 for temporary fixing. When the bag holder 4 is fixed by the bolt 90 to the movable contact plate 91 of the horn switch mechanism 9, the insert member 5 is locked at the locking leg portion 5a to the locking hole 91a of the movable contact plate 91, and temporarily fixes the bag holder 4 to the movable contact plate 91. Numeral 89 at the center of FIG. 4 designates a cover member fixed to the end portion of the bolt 7 by a spring nut 88. The cover member 89 protects a cord 87 connected to the inflator 6.

The manufacturing of the pad 11 in the embodiment is described below.

First, the insert 14 is manufactured. In this case, the net inserts 17, 27 with the reinforcing piece 18 sewed thereto are respectively disposed to the predetermined jig of the industrial sewing machine. The attaching plate 19 is provided to the upper surface of one side fringe of the net inserts 17, 27. Then the net inserts 17, 27 and the attaching plate 19 are connected by means of sewing. Since a portion of the flat attaching plate 19 is provided next to one side fringe of the net inserts 17, 27, these processes are simple especially during sewing.

Subsequently the attaching hole 19a of the attaching plate 19 and the attaching hole 15d of the base insert 15 are aligned. The attaching plate 19 and the base insert 15 are fixed by the rivets 20 through the attaching holes 19a, 15d. Thus the insert 14 is prepared by integrating the net inserts 17, 27 with the attaching plates 19, 19 and the base insert 15.

The insert 14 is set to the predetermined metal mold, and the coating layer 12 is molded by injection molding, thereby manufacturing the predetermined pad 111.

As the attaching plate 19 is made of synthetic resin which is more rigid than the net inserts 17, 27, it is easy to set the attaching plate 19 having the net inserts 17, 27 to the base insert 15, and thereby reduce the manufacturing cost.

In the pad 11 in the embodiment, the flexible net inserts 17, 27 are connected to the attaching plate 19 at substantially the whole portion by a plurality of sewing threads. That is, when the air bag 1 is inflated and the upper wall 11A is opened, even if large forces are applied to the net inserts 17, 27, such forces can be diffused to or spread across the whole portion.

Also in the pad 11 of the embodiment, the net inserts 17, 27 are connected by sewing on the inner surface of the pad 11 of the attaching plate 19. The attaching plate 19 is fixed to the base insert 15 so that its upper edge is higher than the upper edge of the base insert 15. Therefore when the upper wall 11A of the pad is opened, damage to inserts 17, 27 can be avoided as there is no interference with the base insert 15 made of metal.

Further in the pad 11 of the embodiment, the cover portions 19b that cover the upper edge of the four corners of the base insert 15 are formed on both lateral ends of the attaching plate 19. Therefore when the upper wall 11A of the pad is opened, exposure of the upper edge of the base insert 15 made of metal can be prevented by cover portions 19b.

Moreover in the pad 11 of the embodiment, the extension portion 19c extends in nearly a horizontal direction and is formed on the attaching plate 19, and embedded in the resin portion 12a extending along each spoke section S. Each extension portion 19c prevents each resin portion 12a from being deformed and makes each resin portion 12a firm. Therefore when the horn is operated, even if the resin portion 12a of the pad 11 is pushed, the pad 11 together with the bag holder 4 can be easily pushed.

What is claimed is

1. A pad covering an inflatable air bag for use in an air bag device, said pad being provided with an upper wall, said upper wall being broken upon inflation of said air bag, said pad also being provided with side walls extending downward from peripheral edges of said upper wall, said pad comprising:
   (a) a base insert made of metal and disposed next to said side walls;
   (b) a flexible net insert disposed within said upper wall;
   (c) an attaching plate means made of synthetic resin for connecting said base insert and said net insert; and
   (d) a coating layer made of soft synthetic resin for covering said base insert, said net insert and said attaching plate means.

2. The pad as claimed in claim 1, wherein said net insert is connected to said attaching plate by means of sewing.

3. The pad as claimed in claim 2, wherein said sewing means includes a connection of substantially one entire side fringe of said net insert to said attaching plate means.

4. A pad covering an inflatable air bag for use in an air bag device, said pad being provided with an upper wall, said upper wall being broken upon inflation of said air bag, said pad also being provided with side walls extending downward from peripheral edges of said upper wall, said pad comprising:
   (a) a base insert disposed next to said side walls;
   (b) a flexible net insert disposed within said upper wall;
   (c) attaching plate means for connecting said base insert and said net insert; and
   (d) a coating layer made of soft synthetic resin for covering said base insert, said net insert and said attaching plate means,
   wherein said base insert is of a rectangular frame-like shape, and said attaching plate means is of a band shape and is connected to two sides of said base insert in a longitudinal direction.

5. The pad as claimed in claim 4, wherein said attaching plate means has cover portions that cover an upper side of corners of said base insert.

6. The pad as claimed in claim 5, wherein said attaching plate means is provided with an extension portion projecting from said corners of said base insert and embedded in said soft synthetic resin of said coating layer.

7. A pad covering an inflatable air bag for use in an air bag device, said pad being provided with an upper wall, said upper wall being broken upon inflation of said air bag, said pad also being provided with side walls extending downward from peripheral edges of said upper wall, said pad comprising:
   (a) a base insert disposed next to said side walls;
   (b) a flexible net insert disposed within said upper wall;
   (c) attaching plate means for connecting said base insert and said net insert; and
   (d) a coating layer made of soft synthetic resin for covering said base insert, said net insert and said attaching plate means,
   wherein an upper edge of said attaching plate means is higher than an upper edge of said base insert.

8. A pad covering an inflatable air bag for use in an air bag device, said pad being provided with an upper wall, said upper wall being broken upon inflation of said air bag, said pad also being provided with side walls extending downward from peripheral edges of said upper wall, said pad comprising:
   (a) a base insert disposed next to said side walls;
   (b) a flexible net insert disposed within said upper wall;
   (c) attaching plate means for connecting said base insert and said net insert; and
   (d) a coating layer made of soft synthetic resin for covering said base insert, said net insert and said attaching plate means;
   wherein said attaching plate means is connected to said base insert by rivets, and said net insert prevents interference between the rivets and said attaching plate means.

9. A pad covering an inflatable air bag for use in an air bag device, said pad being provided with an upper wall, said upper wall being broken upon inflation of said air bag, said pad also being provided with side walls extending downward from peripheral edges of said upper wall, said pad comprising:
   (a) a base insert made of metal and disposed next to said side walls;
   (b) a flexible net insert disposed within said upper wall;
   (c) a pair of attachment members each extending along and being connected to one side of said base insert, said net insert being connected to said pair of attachment members; and
   (d) a coating layer made of soft synthetic resin for covering said base insert, said net insert and said attachment members.

10. The pad as claimed in claim 9, wherein said net inset is connected to said attachment members by means of sewing.

11. The pad as claimed in claim 10, wherein said net insert comprises two pieces of net, substantially one entire side fringe of one of said two pieces of net being connected to one of said pair of attachment members, substantially one entire side fringe of the other one of said two pieces of net being connected to the other one of said pair of attachment members.

* * * * *